No. 897,658. PATENTED SEPT. 1, 1908.
J. REBAR.
FENDER FOR LOCOMOTIVES AND STREET CARS.
APPLICATION FILED JUNE 22, 1908.
2 SHEETS—SHEET 1.
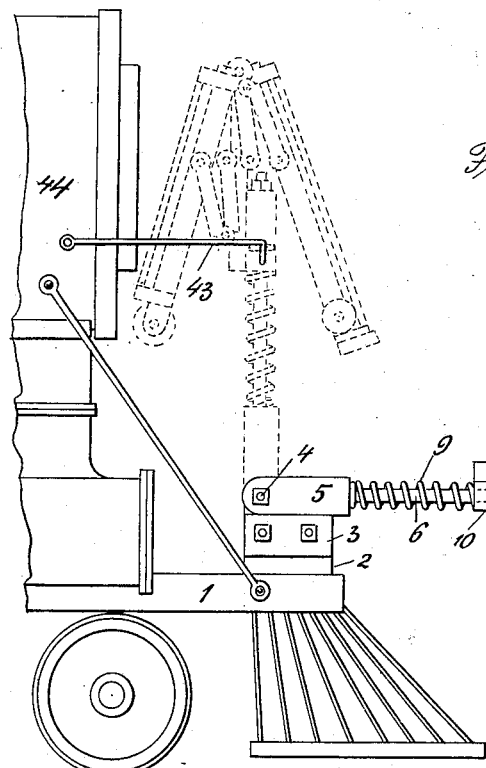
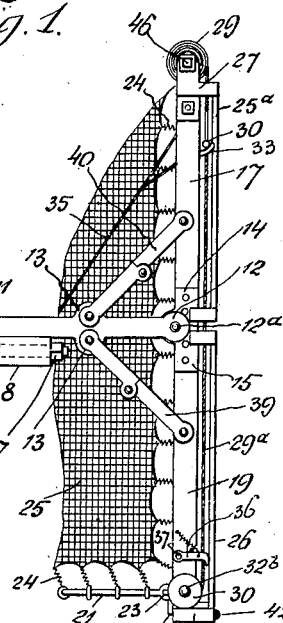
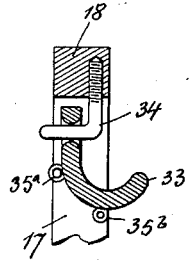
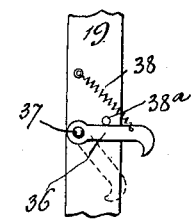
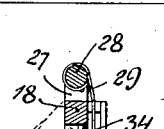
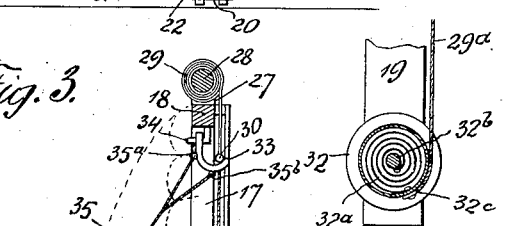
Witnesses
A. H. Rabsag,
O. H. Butler
Inventor
John REBAR,
by H. C. Evert
Attorneys
THE NORRIS PETERS CO., WASHINGTON, D. C.

No. 897,658.
PATENTED SEPT. 1, 1908.
J. REBAR.
FENDER FOR LOCOMOTIVES AND STREET CARS.
APPLICATION FILED JUNE 22, 1908.
2 SHEETS—SHEET 2.
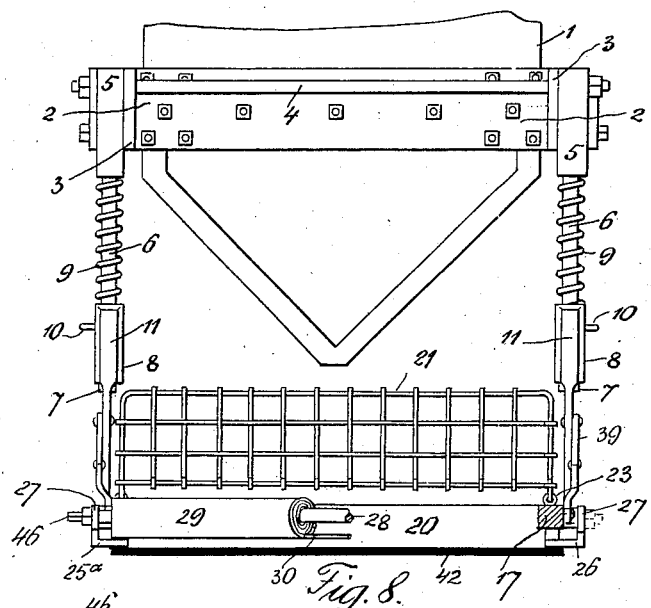
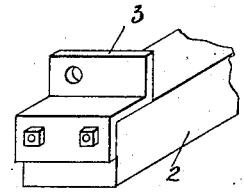
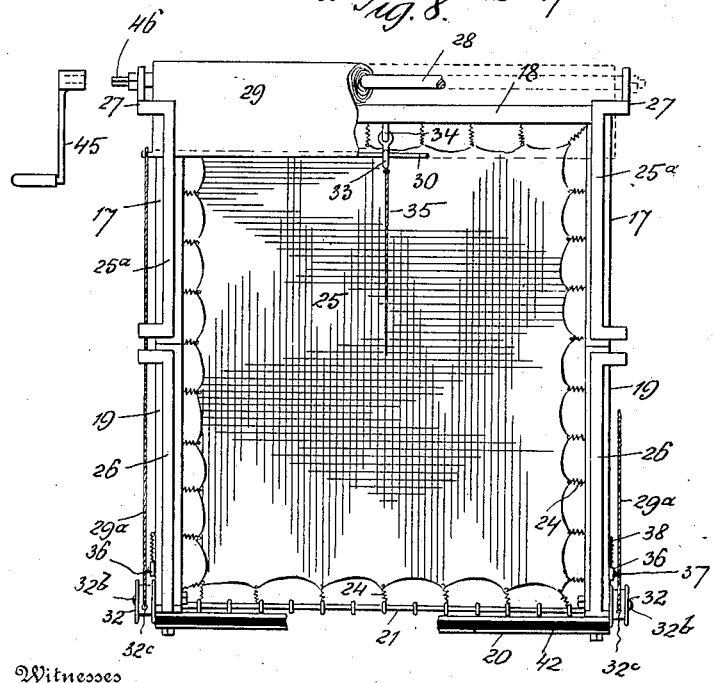
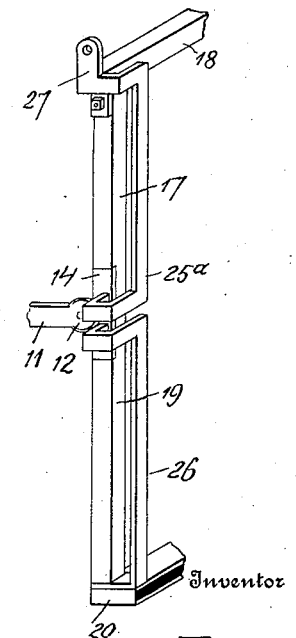
Witnesses
A. H. Rabsay,
R. H. Butler
Inventor
John REBAR,
By H. C. Evert & Co.
Attorneys

UNITED STATES PATENT OFFICE.

JOHN REBAR, OF SMITHDALE, PENNSYLVANIA.

FENDER FOR LOCOMOTIVES AND STREET-CARS.

No. 897,658.   Specification of Letters Patent.   Patented Sept. 1, 1908.

Application filed June 22, 1908. Serial No. 439,725.

*To all whom it may concern:*

Be it known that I, JOHN REBAR, a citizen of the United States of America, residing at Smithdale, in the county of Allegheny and State of Pennsylvania, have invented certain new and useful Improvements in Fenders for Locomotives and Street-Cars, of which the following is a specification, reference being had therein to the accompanying drawing.

This invention relates to a fender for locomotives and street cars, and the object of my invention is to provide a novel life saving device for preventing persons from being injured or killed when run down by a locomotive or street car.

My invention aims to provide a foldable fender that will occupy a comparatively small space when not in use. The fender is constructed of light and durable metal and is cushioned or resiliently held by a locomotive, whereby the fender will slightly recede when contacting with a person.

To prevent a person from falling from the fender after being saved, I provide the fender with an automatic curtain adapted to close and retain a person within the fender, until the locomotive has come to a stand-still.

My invention will be presently described in detail and then specifically pointed out in the appended claims.

Referring to the drawings;—Figure 1 is a side elevation of a portion of a locomotive equipped with my fender, the fender being illustrated in a folded position in dotted lines, Fig. 2 is a vertical sectional view of a portion of a fender with the curtain thereof in a closed position, Fig. 3 is a similar view with the curtain in an open position, Fig. 4 is an enlarged detail sectional view of a hook-shaped member for holding the curtain in an elevated position, Fig. 5 is an enlarged elevation of a curtain holding latch, Fig. 6 is an enlarged cross sectional view of a spring drum, Fig. 7 is a plan of a portion of my fender, partly broken away, Fig. 8 is a front elevation of the same partly broken away, Fig. 9 is a detail perspective of an arm bearing, and Fig. 10 is a detail perspective view of a portion of the fender frame.

To put my invention into practice, I provide the pilot 1 of a locomotive with a transverse beam 2 having bearings 3 for a fixed shaft 4.

Pivotally mounted upon the ends of the shaft 4 are forwardly projecting parallel arms 5, each arm having a spring supporting rod 6. Slidably mounted upon the rods 6 and retained thereon by nuts 7 are sleeves 8, said sleeves being normally held in engagement with the nuts 7 by coil springs 9 mounted upon the rods 6 between the forward ends of the arms 5 and the rear ends of the sleeves 8. The outer sides of the sleeves 8 are provided with eyelets 10 for an object that will presently appear. The sleeves 8 are provided with forwardly projecting brackets 11, the forward ends of said brackets having openings 12 formed therein, while said brackets intermediate their ends are provided with bearings 13.

Pivotally connected to the forward ends of the brackets 11 by virtue of the openings 12 and pins or rivets $12^a$, are upper hinged members 14 and lower hinged members 15, and attached to the upper hinged members 14 are side frames 17 connected by a transverse bar 18, while the lower hinged members 15 are provided with side frames 19 connected by a transverse bar 20. The side frames 17 and 19, and bars 18 and 20 form a rectangular frame when the fender is in use. If preferred the members 14 and 15 may be discarded and the forward ends of brackets 11 attached direct to the frames. The transverse bar 20 is provided with a rearwardly extending skeleton platform 21 normally held in a horizontal position by depending lugs 22 engaging the rear face of the bar 20, these lugs being arranged at the pivotal connections 23 of said fender frame.

Connected to the rear edges of the side frames 17 and 19, bar 18 and the edges of the skeleton platform 21 by spiral springs 24 is a net 25, said net being semi-bag-shaped to provide an inclosure for a person upon the platform 21. Heavy rubber bands can be used in lieu of the spiral spring 24.

Forming part of the side frames 17 and 19 are vertical curtain guides $25^a$ and 26, the upper ends of the curtain guides terminating in brackets 27 for a revoluble transverse shaft 28, to which is attached a curtain 29. The end of this curtain 29 is provided with a steel curtain rod 30 and connecting with the protruding ends of said rod are cables $29^a$. The lower ends of these cables are attached to spring drums 32, carried by the lower ends of the frames 19. The drums 32 are of a conventional form having spiral springs $32^a$ inclosed thereby, with an end of each spring attached to the spindle $32^b$ of the drums and the opposite ends of said springs attached to the inner sides of the drums, as at 32ª. With the curtain in a raised or rolled position, as illustrated in Figs. 1, 3 and 8, of the drawings, the springs 32ª are under tension and are designed to immediately close or draw down the curtain upon said curtain being released.

To maintain the curtain in a raised position with the springs 32ª under tension, a hook-shaped member 33 is employed, said member being loosely supported intermediate the ends of the transverse bar 18 upon a depending and rearwardly projecting pin 34. This hook-shaped member 33 is of a sufficient curvature to engage the edge of the central portion of the curtain rod 30 of the curtain 29, and is attached to the central portion of the net 25 by a cable 35. The cable 35 is branched, and attached to the member 33 at two places, as indicated at 35ª and 35ᵇ. The object of this manner of attaching the cable is to first release the hook from the curtain rod, when the cable 35 is jerked, and then release the same from the depending pin 34, whereby, when a person strikes the net 25 the hook-shaped member 33 will be drawn rearwardly, releasing the edge of the curtain 29 and allowing the spring drums 32ª to close the curtain.

The lower outer sides of the frames 19 are provided with latches 36 pivotally connected to said frames, as at 37. The latches are normally held in a horizontal position by coil springs 38. When the curtain 29 is closed by the springs 32ª, these latches recede as the protruding ends of the rod 30 pass said latches, the course of the latches being shown in dotted lines, but immediately upon the curtain being lowered, the latches assume their normal position by virtue of the springs 38, and are limited in their upward movement by pins 38ª carried by frames 19, preventing the curtains from being elevated by a person within the net 25.

To maintain the frames 17 and 19 in vertical alinement, as shown in Fig. 1 of the drawings, I employ toggle links 39 and 40, the links 40 being pivotally connected to the bearings 13 of the brackets 11 and to the side frames 17, while the links 39 are connected to the bearings 13 and to the side frames 19. The pivotal connection between the links 39 and 40 is such that said links cannot collapse except in an inward direction.

The lower transverse bar 20 is provided upon the forward side thereof with a strip of resilient material, as rubber 42, whereby a person impinged by the bar 20 of the fender will not be injured.

In Fig. 1 of the drawings, I have illustrated my fender in a folded position in front of the locomotive, the fender being maintained in this position by pivot hooks 43 attached to the forward end of the boiler 44 of the locomotive, said hooks engaging in the eyelets 10 of the sleeves 8. With the platform 21 folded against the lower half of the fender, the toggle links 39 and 40 can be collapsed to permit of the upper half and the lower half of the fender folding downwardly upon the rear and front sides of the brackets 11, when the arms 5 are swung to a vertical position. The curtain 29 and the net 25 will readily fold between the upper and lower half of the fender.

After the curtain 29 has been lowered to inclose a person within the net 25, the curtain can be raised by placing a crank 45, (see Fig. 8) upon the rectangular end 46 of the shaft 28, the curtain being first lowered a short distance to release the latches 36, at which time the shaft 28 can be rotated to raise the curtain 29 and place the spring drums 32 under tension. It will of course be understood that the hook-shaped member 33 is swung to engage the lower edge of the curtain immediately upon said curtain being raised. The tension of the springs 9 is sufficient to prevent the platform 21 from contacting with the pilot of the locomotive when a person is struck by the fender, and the tension of the springs 24 is sufficient to fully cushion the fall of a person into the net 25.

When my fender is to be used in connection with street cars, the beam 2 and the elements supported thereby can be readily arranged at each end of the street car.

It is thought that the operation and utility of my fender will be readily understood, and while in the drawings forming a part of this specification there is illustrated the preferred embodiments of my invention, it is obvious that the elements therein may be varied or changed without departing from the spirit of the invention.

Having now described my invention, what I claim as new, is;—

1. The combination with a locomotive, of bearings carried thereby, rods pivotally supported by said bearings, spring pressed sleeves slidably mounted upon said rods, forwardly extending brackets carried by said sleeves, said frames pivotally carried by the forward ends of said brackets, transverse bars connecting said side frames, a platform pivotally supported by one of said transverse bars, a net resiliently connected to said platform, to said side frames and to the other of said transverse bars, curtain guides supported by said side frames and terminating in brackets at the upper edge of said fender, a shaft journaled in said brackets, a curtain attached to said shaft and having the lower edge thereof provided with a curtain rod, spring drums carried by the lower edges of said side frames, cables connecting with said drums and with the ends of said curtain rod, spring-held latches mounted adjacent to said spring drums for engaging said curtain rod and holding the curtain in a lowered position, a hook-shaped member attached to said net and loosely mounted upon the transverse bar at the upper edge of said fender for engaging said curtain rod and holding said curtain in a raised position, toggle links connecting said side frames with said brackets, a resilient strip carried by the transverse bar at the lower edge of said fender, and means carried by said locomotive for maintaining said fender in a folded position, substantially as described.

2. The combination with a locomotive, of a fender pivotally mounted thereon, said fender comprising pivotally supported rods, spring-pressed sleeves slidably mounted upon said rods, brackets carried by said sleeves, frames pivotally connected to the outer ends of said brackets, transverse bars connecting said frames, a curtain journaled between the upper ends of said curtain guides, a curtain rod carried by the free edge of said curtain, spring drums supported at the lower edges of said fender, cables connecting said drums and the ends of said curtain rod, spring-held latches arranged adjacent to said drums for engaging said curtain rod and holding said curtain in a lowered position, a hook-shaped member loosely mounted at the upper edge of said fender for holding said curtain in a raised position, a platform supported by one of said transverse bars at the lower edge of said fender, a net resiliently connected to said platform, said frames and the other of said transverse bars, toggle links connecting with said brackets for maintaining said frames in a vertical position, and means carried by said locomotive for maintaining said fender in a folded position.

3. A fender comprising pivotally supported rods, spring-pressed sleeves mounted upon said rods, brackets carried by said sleeves, frames pivotally connected to the forward ends of said brackets, a curtain arranged at the upper ends of said frames, spring drums arranged at the lower edges of said frames and connecting with said curtain for closing the same, a hook-shaped member loosely mounted at the upper edge of said frames for normally holding said curtain in an open or raised position, a net resiliently connected to said frames, toggle links for maintaining said frames in a vertical position, and means carried by a locomotive for supporting said fender in a folded position.

4. A fender comprising pivotally supported rods, spring-pressed sleeves mounted upon said rods, brackets carried by said sleeves, frames pivotally connected to the forward ends of said brackets, a curtain arranged at the upper ends of said frames, spring drums arranged at the lower edges of said frames, cables connecting said drums with said curtain for closing the same, a hook-shaped member loosely mounted at the upper edge of said frames for normally holding said curtain in an open or raised position, a net resiliently connected to said frames, and toggle links for maintaining said frames in a vertical position.

5. A fender comprising pivoted rods, spring-pressed sleeves mounted upon said rods, brackets carried by said sleeves, foldable frames carried by said brackets, a net resiliently connected to said frames, a curtain arranged at the upper edges of said frames and adapted to be automatically lowered to the lower edge of said frames, means for maintaining said curtain in a lowered position, and means arranged at the upper edge of said frames for maintaining said curtain in a raised position.

In testimony whereof I affix my signature in the presence of two witnesses.

JOHN REBAR.

Witnesses:
STEFE KAROLI,
MAX H. SROLOVITZ.